United States Patent [19]

Zikeli et al.

[11] Patent Number: 5,330,567
[45] Date of Patent: * Jul. 19, 1994

[54] PROCESS AND ARRANGEMENT FOR PREPARING A SOLUTION OF CELLULOSE

[75] Inventors: Stefan Zikeli, Regau; Bernd Wolschner; Dieter Eichinger, both of Vöcklabruck; Raimund Jurkovic, Lenzing; Heinrich Firgo, Vöcklabruck, all of Austria

[73] Assignee: Lenzing Aktiengesellschaft, Lenzing, Austria

[*] Notice: The portion of the term of this patent subsequent to Mar. 10, 2009 has been disclaimed.

[21] Appl. No.: 998,774

[22] Filed: Oct. 28, 1992

Related U.S. Application Data

[60] Continuation of Ser. No. 739,920, Aug. 8, 1991, abandoned, which is a division of Ser. No. 389,499, Aug. 4, 1989, abandoned.

[30] Foreign Application Priority Data

Aug. 16, 1988 [AT] Austria .............................. A 2036/88

[51] Int. Cl.$^5$ .......................................... C09D 101/02
[52] U.S. Cl. .................... 106/198; 106/163.1; 106/176; 106/186; 106/170
[58] Field of Search ............... 422/285, 228, 225, 135; 366/325, 327, 149; 106/163.1, 170, 198, 186, 176

[56] References Cited

U.S. PATENT DOCUMENTS

| | | | |
|---|---|---|---|
| 2,761,658 | 9/1956 | Magnusson | 106/197.2 |
| 3,010,803 | 11/1961 | Wistrich et al. | 422/228 |
| 3,285,705 | 11/1966 | Zuiderweg et al. | 422/228 |
| 3,374,989 | 3/1968 | Todtenhaupt | 366/325 |
| 3,508,941 | 4/1970 | Johnson | 106/125 |
| 3,635,901 | 1/1872 | Urgesi et al. | 366/325 |
| 3,695,327 | 10/1972 | Widmer | 159/6.2 |
| 3,709,664 | 1/1973 | Krekeler et al. | 422/225 |
| 4,142,913 | 3/1979 | McCorsley et al. | 106/186 |
| 4,145,532 | 3/1979 | Franks et al. | 536/56 |
| 4,196,282 | 4/1980 | Franks et al. | 536/56 |
| 4,211,574 | 7/1980 | McCorsley et al. | 106/186 |
| 4,246,221 | 1/1981 | McCorlsey | 264/203 |
| 4,256,613 | 3/1981 | Franks et al. | 536/36 |

(List continued on next page.)

FOREIGN PATENT DOCUMENTS

| | | |
|---|---|---|
| 158656 | 2/1904 | Fed. Rep. of Germany . |
| 207380 | 6/1907 | Fed. Rep. of Germany . |
| 548432 | 3/1977 | U.S.S.R. . |
| 803966 | 2/1981 | U.S.S.R. . |
| 994587 | 2/1983 | U.S.S.R. . |
| 1058596 | 12/1983 | U.S.S.R. . |
| 2001320 | 7/1977 | United Kingdom . |

OTHER PUBLICATIONS

Chanzy, H., "Cellulose-Amine Oxide Systems", Carbohydrate Polymers 2 (4) (1982).

(List continued on next page.)

*Primary Examiner*—David Brunsman
*Attorney, Agent, or Firm*—Brumbaugh, Graves, Donohue & Raymond

[57] ABSTRACT

There is disclosed a process for preparing solutions of cellulose in aqueous tertiary amine oxides from a suspension of cellulose in an aqueous solution of the tertiary amine oxide by supplying heat at a reduced pressure. The suspension is transported over a heating surface, spread in layers or coats, until a homogenous solution of the cellulose has formed, which has a viscosity of between 50 and 15,000 Pas.s. Feeding of the suspension and drawing-off of the homogenous solution are carried out continuously. The solutions are prepared in an indirectly heated evacuatable vessel provided with a stirring device. The vessel is designed as a cylindrical container including a centrically mounted stirring shaft having agitators joined thereto, the radial distance of the agitators from the internal wall of the container being 20 mm at the most. There are provided an intake for the cellulose suspension in the upper part of the container and an outlet for the homogenous cellulose solution in its lower end.

9 Claims, 1 Drawing Sheet

U.S. PATENT DOCUMENTS

| | | | |
|---|---|---|---|
| 4,284,545 | 8/1981 | Franks et al. | 524/99 |
| 4,321,106 | 3/1982 | Burkhard et al. | 159/49 |
| 4,324,593 | 4/1982 | Varga | 106/203 |
| 4,416,698 | 11/1983 | McCorlsey | 106/163.1 |
| 4,438,074 | 3/1984 | Wilt | 422/228 |
| 4,460,278 | 7/1984 | Matsubara et al. | 366/149 |

OTHER PUBLICATIONS

Chanzy, H. and Dube', M., "Crystallization of Cellulose with N-Methylmorpholine N-Oxide; A New Method of Texturing Cellulose" J. Polymer Science: Polymer Letters Edition, 17, pp. 219–226 (1978) no month.

Veroffentlicung von F. Strenk in "Chemie" pp. 61–63 (1975) no month.

Hauri, F. W., "Review of Thin-Film Evaporator Technology", International Symposium on Film techniques applied to chemical engineering operations, Rueil-Malmaison, France, (Apr. 27–29, 1983) pp. 319–342.

Burkhard, A., "Technique and Application of Thin-Film Equipment to High Viscous Media", International Symposium on Film techniques applied to chemical engineering operations, Rueil-Malmaison, France, (Apr. 27–29, 1983), pp. 543–574.

PROCESS AND ARRANGEMENT FOR PREPARING A SOLUTION OF CELLULOSE

This application is a continuation of application Ser. No. 07/739,920 now abandoned, filed on Aug. 8, 1991, which is a division of application Ser. No. 07/389,499 now abandoned, filed Aug. 4, 1989.

The invention relates to a process for preparing solutions of cellulose in aqueous tertiary amine oxides from a suspension of cellulose in an aqueous solution of the tertiary amine oxide by supplying heat at a reduced pressure, as well as to an arrangement for carrying out the process.

A process of this kind is described in PCT publication WO 83/04415. There, cellulose is suspended in an aqueous solution of a tertiary amine oxide containing up to 40% by mass of water and is heated to temperatures of between 90° and 120° C. under stirring. At the same time, the pressure is reduced to 80 to 150 mbar and water is drawn off until the cellulose dissolves. In this manner, spinnable solutions containing up to 15% by mass of cellulose are producible.

By shaping these solutions in water films, threads or shaped parts based on cellulose are obtained, i.e., articles which, today, are produced according to the viscose method on a large scale. However, as regards environmental safety, spinnable solutions of cellulose in aqueous tertiary amine oxides have a decisive advantage over viscose: While the tertiary amine oxide is capable of being recovered during spinning and used again, $H_2S$, COS, $CS_2$ and colloidal sulfur form at the decomposition of viscose. These substances can be disposed of only at great expenditures.

Nevertheless, the above-mentioned process using tertiary amine oxides as solubilizing agents has not found general acceptance so far, still involving a number of disadvantages.

Thus, water can be drawn off a stirrer vessel only with difficulties on account of the unfavorable ratio of the liquid surface to the liquid volume, and this results in long residence times ranging between 2 and 4 hours within the stirrer vessel. During that time, the polymer cellulose chain is partially degraded, which is even further promoted by the elevated temperature. This partial degradation, in turn, adversely affects certain properties of the final products after the spinning process, such as, e.g., strength, elongation and loop strength. Furthermore, it is known that heating, in particular to more than 130° C., may lead to a strong discoloration due to the decomposition of the amine oxide used. With some compounds, such as, e.g., N-methyl morpholine N-oxide, this degradation even may occur like an explosion under vigorous gas development such that the solutions present in the stirrer vessel constitute a safety risk by their amount.

When carrying out the process on a large scale, one would, therefore, have to operate at adequate safety provisions with high pressure autoclaves if stirrer vessels were used, which autoclaves are out of the question for continuous operation for economic reasons. On the other hand, without safety means, only a discontinuous operation is possible in the stirrer vessel, which renders the process rather inflexible, because it is difficult to vary parameters, such as, e.g., the temperature and the eva-potation rate. Add to this that, due to the high viscosity of the cellulose solutions, much spinning mass is retained by the stirrer vessel, which impairs the cleaning of the vessel and further reduces the economy of the process.

The invention has as its object to eliminate these disadvantages and to provide a process for producing cellulose solutions in aqueous tertiary amine oxides, which is operable continuously, wherein the heat treatment of the suspension is to be performed over a substantially shorter period of time in order to minimize the thermal load on the cellulose and the tertiary amine oxide. Moreover, the safety risk inherent in the prior art is to be avoided. The invention, furthermore, seeks to provide an arrangement for carrying out the process, which does not have the disadvantages connected with stirrer vessels and high-pressure autoclaves.

In accordance with the invention, this object is achieved in that the suspension is transported over a heating surface, spread in layers or coats, until a homogenous solution of the cellulose has formed, which has a viscosity of between 50 and 15,000 Pas.s, feeding of the suspension and drawing-off of the homogenous solution being carried out continuously.

The spreading of the cellulose suspension in layers or coats over the heating surface results in a large liquid surface, which facilitates the removal of water. At the same time, rapid heating of the suspension to the temperature required for the preparation of the solution is feasible. By being transported over the heating surface continuous mixing of the suspension is ensured, which further promotes the heat and substance exchanges.

To adjust the viscosity of the solution, which is measured in the relative system, and to influence the swelling behavior of the cellulose within the suspension, a diluent, e.g., ethanol, may be added to the suspension.

Particularly good mixing is ensured if the layer spread over the heating surface has a thickness of 20 mm at the most, preferably 1.5 to 5 mm.

Advantageously, N-methyl morpholine N-oxide is used as the tertiary amine oxide, preferably in an aqueous solution containing 40% by mass of water.

A preferred embodiment of the process according to the invention is characterized in that the suspension is brought to a temperature of between 50° and 150° C., preferably of between 60° and 100° C., and is subjected to a pressure of from 0.5 mbar to 1,000 mbar, preferably 50 mbar to 150 mbar.

It has proved particularly favorable if the suspension is contacted with the heating surface for a period of from 1 min to 60 min. This period of time, on the one hand, is sufficient to produce a homogenous solution and, on the other hand, is so short that the decomposition of the tertiary amine oxide and the degradation of the cellulose are largely prevented.

A suitable arrangement for carrying out the process of the invention, comprising an indirectly heated evacuatable vessel provided with a stirring means, is characterized in that the vessel is designed as a cylindrical container including a centrically mounted stirring shaft having agitators joined thereto, the radial distance of the agitators from the internal wall of the container being 20 mm at the most, and there are provided an intake for the cellulose suspension in the upper part of the container and an outlet for the homogenous cellulose solution in its lower end.

An advantageous embodiment of the arrangement according to the invention comprises a distribution ring provided at the stirring shaft to spread the cellulose suspension like a layer or coat on the internal wall of the container.

To control the transportation of the cellulose suspension along the internal wall of the container, it has proved advantageous if the agitators have an angle of inclination relative to the axis of the stirring shaft, which is adjustable in size.

The process according to the invention to be performed with the arrangement according to the invention is extremely flexible with regard to varying the operational parameters and involves a substantially lower safety risk as compared to the prior art, since no large amount of solvent is heated at once, but only a comparatively small amount is continuously heated due to the solvent being spread in layers over the heating surface.

BRIEF DESCRIPTION OF THE DRAWINGS

The arrangement according to the invention will now be explained in more detail with reference to FIGS. 1 and 2, wherein.

Figure 1:
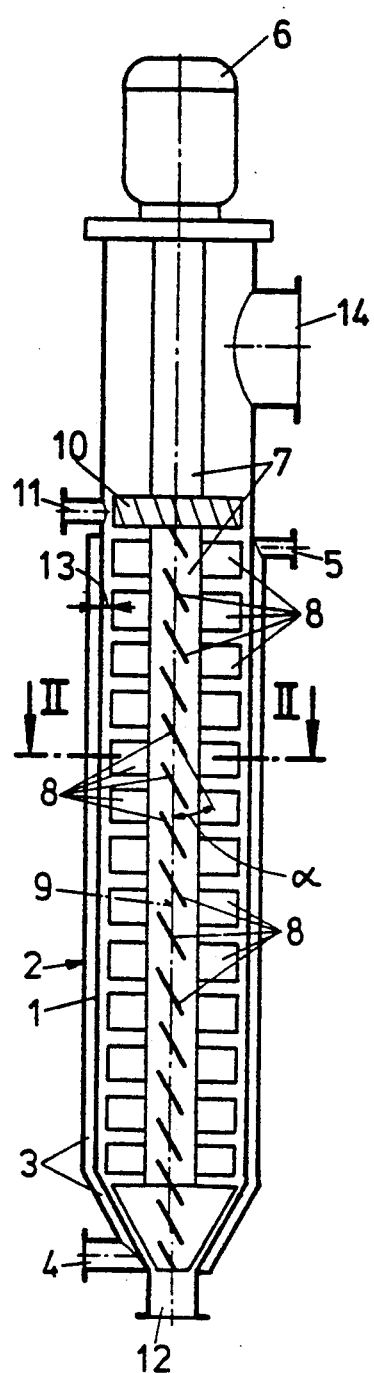
FIG. 1 is a partial longitudinal section through the arrangement according to the invention.

1 denotes the internal wall of a preferably upright rotational body, which, in the exemplary embodiment illustrated, is designed as a cylindrical container 2 almost over its entire length. For the major part, the internal wall 1 is surrounded by a heating jacket 3 including connection means 4 and 5 for heating medium, the connection means 4 serving to supply, and the connection means 5 serving to discharge, the heating medium.

A stirring shaft 7 comprising agitators 8 joined thereto is centrically mounted within the container 2 and driven by a motor 6. The agitators 8, which are plain in the exemplary embodiment illustrated, extend radially to the axis, their plane enclosing an angle of inclination alpha relative to the axis 9 of the stirring shaft 7, which preferably is adjustable in size. A distribution ring 10 is attached to the stirring shaft 7 above the agitators 8, spreading the cellulose suspension introduced through intake 11 on the internal wall 1 in layers. The distribution ring 10, thus, is provided at the level of the intake 11.

On its lower end, the container 2 is frustoconically tapered, including an outlet 12 for the homogenous cellulose solution. The agitators 8 have a constant radial distance 13 from the internal wall 1 of the container 2 over the total extension of the container 2, which distance is 20 mm at most.

On the upper part of the container 2, i.e., above the plane of the distribution ring 10, an opening 14 is provided for evacuating the container 2 and for drawing off water vapor.

The arrangement functions in the following manner:

The cellulose suspension—if desired in a pre-heated state—is continuously fed, through the intake 11, into the container 2 being under a reduced pressure, is seized there by the distribution ring 10, is spread on the internal wall 1 and is transported by the agitators 8, along the indirectly heated internal wall 1 serving as heating surface, to the outlet 13 on the lower end of the container 2. Heat carrier media, such as water, oil or vapor, are suited for indirect heating.

The cellulose suspension is heated during its transportation along the indirectly heated internal wall 1 and water simultaneously evaporates due to the reduced pressure, so that the tertiary amine oxide becomes concentrated until the cellulose dissolves.

Figure 2:
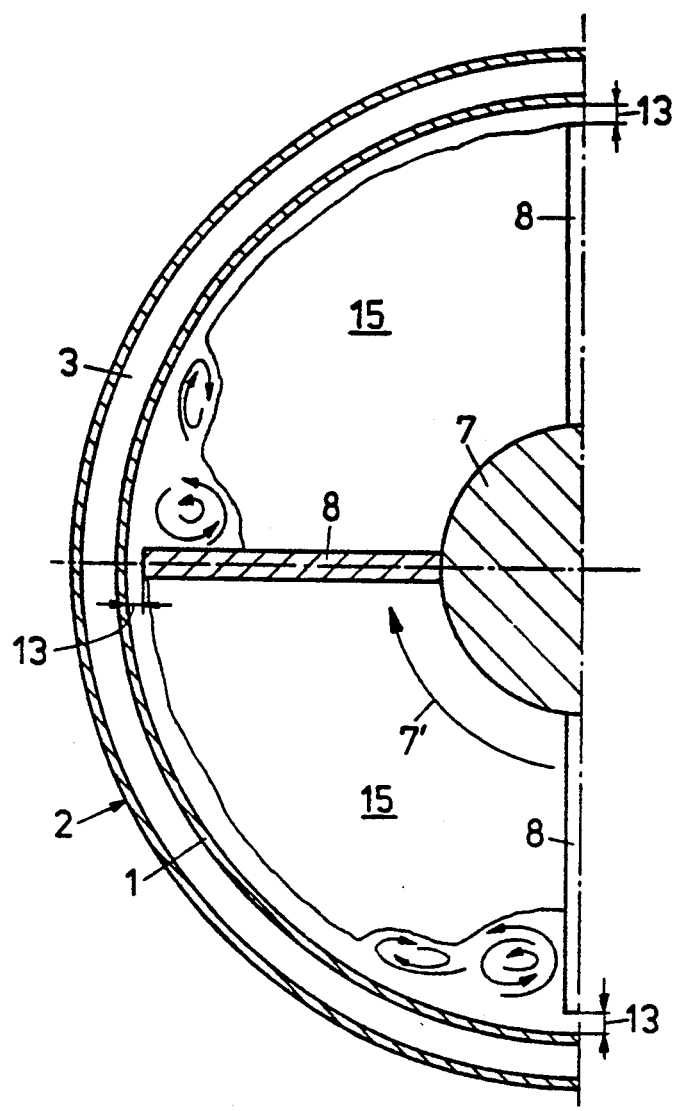
FIG. 2 illustrates a section along line II—II of FIG. 1 on an enlarged scale.

FIG. 2 illustrates in detail how the cellulose suspension is processed in the container 2. It shows the stirring shaft 7 with agitators 8, the internal wall 1 and the heating jacket 3, a rotation direction of the stirring shaft 7 in the clock-wise direction having been assumed and illustrated by arrow 7'. The spreading in layers, respectively the thickness of the layer of cellulose suspension, is provided by the radial distance 13 of the agitators 8 from the heated internal wall 1. Bow waves of cellulose suspension, which are schematically illustrated in FIG. 2, are formed at the agitators by the rotational movement. As indicated in FIG. 2, the cellulose particles are circulated in these bow waves, which movement is translated to the suspension layer spread on the internal wall 1. Thereby, continuous rearrangement as well as intensive mixing of the suspension are safeguarded, substantially promoting the heat and substance exchanges.

It is decisive to the continuous control of the process according to the invention that the water vapor separated is drawn off in counterflow relative to the suspension transport. Moreover, it is important to the rapid drawing off of water vapor to provide for a sufficiently large exhaust vapor space 15, which is the case if the ratio of the length to the diameter of the cylindrical part of the container 2 amounts to between 4 and 8.

By means of the invention, it is possible to produce cellulose solutions containing up to 30% by mass of cellulose.

The invention will be explained in even more detail by the following examples:

EXAMPLE 1

A suspension of prehydrolysis sulfate cellulose (degree of polymerization about 1,400) in an aqueous solution of N-methyl morpholine N-oxide having a water content of 40% by mass was heated to 70° C. and continuously introduced into the arrangement according to the invention at an amount of 90 kg/h through intake 11. The content of prehydrolysis sulfate cellulose in the suspension was chosen such that a final concentration of cellulose of 10% by mass was obtained after evaporation of excess water.

The stirring shaft 7 was operated at a speed of 450 min$^{-1}$, the thickness of the layer spread over the internal wall being 15 mm. The indirectly heated internal wall 1 had a surface of 0.5 m$^2$ and was heated with heat carrier oil in a manner that a mean temperature difference of 83° C. resulted as a function of the heating up of the suspension (in counterflow relative to the heat carrier oil). In the exhaust vapor space 15, a pressure if 100 mbar was adjusted.

72 kg of homogenous cellulose solution per hour were obtainable at the outlet 12, which corresponds to a residence time of the suspension within the arrangement of the invention of 3 min. The solution was capable of being discharged in a degassed form. Its viscosity was 1,500 Pas.s (measured in the relative system). It was ascertained by microscopic assaying of the solution that no undissolved cellulose particles were present in the solution.

The exhaust vapors formed were drawn off in counterflow at a temperature of 70° C. and subsequently were condensed, the distillate stream being 29 kg per hour.

EXAMPLE 2

A suspension of ground prehydrolysis sulfate cellulose (degree of polymerization about 1,400) in an aqueous solution of N-methyl morpholine N-oxide having a water content of 40% by mass was heated to 80° C. and was continuously introduced into the arrangement of the invention through intake 11 at an amount of 90 kg/h. The content of prehydrolysis sulfate cellulose was chosen such that a final concentration of cellulose of 15% mass was obtained after evaporation of excess water.

The stirring shaft 7 was operated at a speed of 450 min$^{-1}$, the thickness of the layer spread over the internal wall 1 amounting to 1.5 mm. The indirectly heated internal wall 1 had a surface of 0.5 m$^2$ and was heated with heat carrier oil in a manner that a mean temperature difference of 112° C. resulted as a function of the heating up of the suspension (in counterflow relative to the heat carrier oil). In the exhaust vapor space 15, a pressure of 150 mbar was adjusted.

64 kg of homogenous solution per hour were obtainable at the outlet 12, incurring in a degassed form. This mass flow corresponded to a residence time of 4 min.

The solution was obtained as a high-viscous mass (11,000 Pas.s, measured in the relative system), no undissolved cellulose particles being detectable under the microscope. The solution was directly supplied to a spinning machine and spun to cellulosic fibers.

The exhaust vapors formed were drawn off in counterflow at a temperature of 80° C. and subsequently were condensed, the distillate stream being 26 kg per hour.

What we claim is:

1. A method of preparing a solution of cellulose in aqueous tertiary amine oxide from a suspension of cellulose in an aqueous tertiary amine oxide solution using an apparatus comprising a vertically oriented indirectly heated and evacuatable vessel having a cylindrical internal wall, an inlet means in the upper part of the vessel, an elongated rotatable shaft mounted centrally of the vessel, a spreading means fixed to the shaft adjacent the inlet means, an agitator means fixed to the shaft below the spreading means, and an outlet means at the lower part of the vessel, said method comprising the steps of:

heating the internal wall of said vessel to a temperature of between 50° and 150° C.;

continuously supplying a suspension of cellulose in an aqueous solution of a tertiary amine oxide to the inlet means;

spreading the suspension on said heated internal wall with said spreading means as it is supplied to the inlet means to form a coat or layer on said internal wall;

continuously rotating said shaft to cause said agitator means to move said layer or coat downwardly along said heated inner wall while intensively mixing said suspension;

subjecting the interior of said vessel to a pressure of 0.5 mbar to 1000 mbar to promote evaporation of water from said layer or coat of cellulose suspension as it moves downwardly along said internal wall to concentrate said aqueous tertiary amine oxide solution until said cellulose dissolves; and continuously discharging the resultant cellulose solution from said outlet means.

2. The method of claim 1 wherein said agitator means is provided in the form a plurality of elongated substantially planar agitators fixed to said shaft along its length and extending perpendicularly thereof towards said internal wall, said agitators being arranged in diametrically opposed pairs with each pair being oriented 90° around said shaft with respect to its upper and lower adjacent pairs, each of said agitators being inclined at an angle to the axis of said shaft, and wherein the horizontal projections of the widths of each pair of agitators overlap the horizontal projections of the widths of the agitators of its respective upper and lower adjacent pairs.

3. The method of claim 2 further comprising spacing the outer edge of each of said agitators from said internal wall a radial distance of no more than 20 mm.

4. The method of claim 3 wherein the spacing of the outer edges of said agitators from said internal wall is selected to provide layer or coat on said internal wall having a thickness of from 1.5 to 5 mm.

5. The method of claim 4 further comprising adjusting the angle of inclination of said agitators with respect to said shaft to move said coat or layer along said interior wall at a speed to produce a homogeneous cellulose solution without decomposition of the tertiary amine oxide or degradation of the cellulose.

6. The method of claim 1 wherein said tertiary amine oxide is N-methyl morpholine N-oxide.

7. The method of claim 1 wherein said N-methyl morpholine N-oxide is in an aqueous solution containing 40% by mass of water.

8. The method of claim 1, wherein said internal wall is heated to a temperature of between 60° and 100° C. and the interior of said vessel is subjected to pressure of from 50 mbar to 150 mbar.

9. The method of claim 1, wherein the period of movement of said layer along said inner wall is from 1 minute to 60 minutes.

* * * * *

UNITED STATES PATENT AND TRADEMARK OFFICE
CERTIFICATE OF CORRECTION

PATENT NO. : 5,330,567

DATED : July 19, 1994

INVENTOR(S) : Zikeli et al.

It is certified that error appears in the above-indentified patent and that said Letters Patent is hereby corrected as shown below:

On the title page, Item [56]:
Other Publications should include

--Luwa Brochure "Highly Viscous Technology" (1976)

Heimgartner, Erich, "Degassing in the Thin-Film Evaporator"

Widmer, F., "Treatment of Viscous Substances in Thin-Layer Equipment"

Komori, S., et al., J. Chem. Eng. of Japan, 22 (4), pp. 346-351 (1989)

Nakamura, K., et al., Chem. Eng. Commun., 18, pp. 173-190 (1982)

Angell, C.W., et al., Chem. Eng. Prog. (May 1983), pp. 52-55

Freese, H.L., et al., Chem. Eng. Prog. (January 1979), pp. 52-58

Mutzenburg, A.B., Chem. Eng. (September 13, 1965), pp. 175-190

Widmer, F., Polymerization Kinetics and Technology (1973), pp. 51-67

Buijtenhuis, M., et al., Das Papier, 40 (12), pp. 615-619 (1986)

Bachmann, R., et al., Chem. and Process Eng., p. 51 (March 1971)

Mutzenburg, A.B., and Giger, A., Trans. Instn. Chem. Engrs., Vol. 46, pp. T187-189 (1968)--

UNITED STATES PATENT AND TRADEMARK OFFICE
CERTIFICATE OF CORRECTION

PATENT NO. : 5,330,567

DATED : July 19, 1994

INVENTOR(S) : Zikeli et al.

It is certified that error appears in the above-identified patent and that said Letters Patent is hereby corrected as shown below:

Col. 1, line 66 "eva-potation" should read --evaporation--

Col. 3, line 63 "13" should read --12--

Col. 4, line 54 "if" should read --of--

Col. 5, line 11 "mass" should read --by mass--

Col. 6, line 15 a" should read --of a--

Col. 6, line 35 "4" should read --3--

Col. 6, line 38 "speed to" should read --speed selected to--

Col. 6, line 43 "1" should read --6--

Signed and Sealed this

Eighteenth Day of October, 1994

Attest:

BRUCE LEHMAN

Attesting Officer

Commissioner of Patents and Trademarks